(12) United States Patent
Nakano et al.

(10) Patent No.: US 8,548,808 B2
(45) Date of Patent: Oct. 1, 2013

(54) SPEECH UNDERSTANDING APPARATUS USING MULTIPLE LANGUAGE MODELS AND MULTIPLE LANGUAGE UNDERSTANDING MODELS

(75) Inventors: Mikio Nakano, Wako (JP); Masaki Katsumaru, Wako (JP); Kotaro Funakoshi, Wako (JP); Hiroshi Okuno, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 882 days.

(21) Appl. No.: 12/691,958

(22) Filed: Jan. 22, 2010

(65) Prior Publication Data

US 2010/0191530 A1 Jul. 29, 2010

Related U.S. Application Data

(60) Provisional application No. 61/146,739, filed on Jan. 23, 2009.

(51) Int. Cl.
*G10L 15/00* (2013.01)
*G10L 15/18* (2013.01)
(52) U.S. Cl.
USPC ............ 704/257; 704/231; 704/240; 704/244
(58) Field of Classification Search
USPC .................................. 704/231, 240, 244, 257
See application file for complete search history.

(56) References Cited

U.S. PATENT DOCUMENTS

| 4,829,575 A | * | 5/1989 | Lloyd | ............................. 704/238 |
| 5,651,096 A | * | 7/1997 | Pallakoff et al. | ............... 704/275 |
| 5,870,706 A | * | 2/1999 | Alshawi | ......................... 704/255 |
| 6,167,377 A | * | 12/2000 | Gillick et al. | .................. 704/240 |
| 6,868,383 B1 | * | 3/2005 | Bangalore et al. | ............. 704/254 |

(Continued)

FOREIGN PATENT DOCUMENTS

| JP | 9-274498 | 10/1997 |
| JP | 2003-228393 | 8/2003 |
| JP | 2007-47488 | 2/2007 |
| JP | 2008-293019 | 12/2008 |

OTHER PUBLICATIONS

Gold, B. et al. "Speech and Audio Signal Processing, Processing and Perception of Speech and Music." John Wiley and Sons, Inc, New York, 2000. pp. 105-106.*

(Continued)

*Primary Examiner* — Talivaldis Ivars Smits
*Assistant Examiner* — Shaun Roberts
(74) *Attorney, Agent, or Firm* — Nelson Mullins Riley & Scarborough LLP; Anthony A. Laurentano

(57) ABSTRACT

A speech understanding apparatus includes a speech recognition unit which performs speech recognition of an utterance using multiple language models, and outputs multiple speech recognition results obtained by the speech recognition, a language understanding unit which uses multiple language understanding models to perform language understanding for each of the multiple speech recognition results output from the speech recognition unit, and outputs multiple speech understanding results obtained from the language understanding, and an integrating unit which calculates, based on values representing features of the speech understanding results, utterance batch confidences that numerically express accuracy of the speech understanding results for each of the multiple speech understanding results output from the language understanding unit, and selects one of the speech understanding results with a highest utterance batch confidence among the calculated utterance batch confidences.

6 Claims, 1 Drawing Sheet

(56) References Cited

U.S. PATENT DOCUMENTS

| | | | |
|---|---|---|---|
| 6,961,693 B2* | 11/2005 | Kempe | 704/9 |
| 6,963,831 B1* | 11/2005 | Epstein | 704/9 |
| 7,003,456 B2* | 2/2006 | Gillick et al. | 704/235 |
| 7,010,476 B2* | 3/2006 | Karttunen et al. | 704/1 |
| 7,120,586 B2* | 10/2006 | Loui et al. | 704/275 |
| 7,277,732 B2* | 10/2007 | Chen et al. | 455/566 |
| 7,548,847 B2* | 6/2009 | Acero et al. | 704/9 |
| 7,743,011 B2* | 6/2010 | Beesley | 706/48 |

OTHER PUBLICATIONS

De Mori, Renato. "Spoken language understanding: A survey." Automatic Speech Recognition & Understanding, 2007. ASRU. IEEE Workshop on. IEEE, 2007.*

Barrault, Loic, et al. "Frame-based acoustic feature integration for speech understanding." Acoustics, Speech and Signal Processing, 2008. ICASSP 2008. IEEE International Conference on. IEEE, 2008.*

Raymond, Christian, et al. "On the use of finite state transducers for semantic interpretation." Speech Communication 48.3 (2006): 288-304.*

Fiscus, Jonathan G., "A Post-processing System to Yield Reduced Word Error Rates: Recognizer Output Voting Error Recution (Rover)," IEEE Workshop on Automatic Speech Recognition and Understanding, pp. 347-354 (1997).

Hahn, Stefan et al., "System Combination for Spoken Language Understanding," Interspeech, pp. 236-239 (2008).

Japanese Office Action for Application No. 2010-011175, 4 pages, dated Aug. 6, 2013.

* cited by examiner

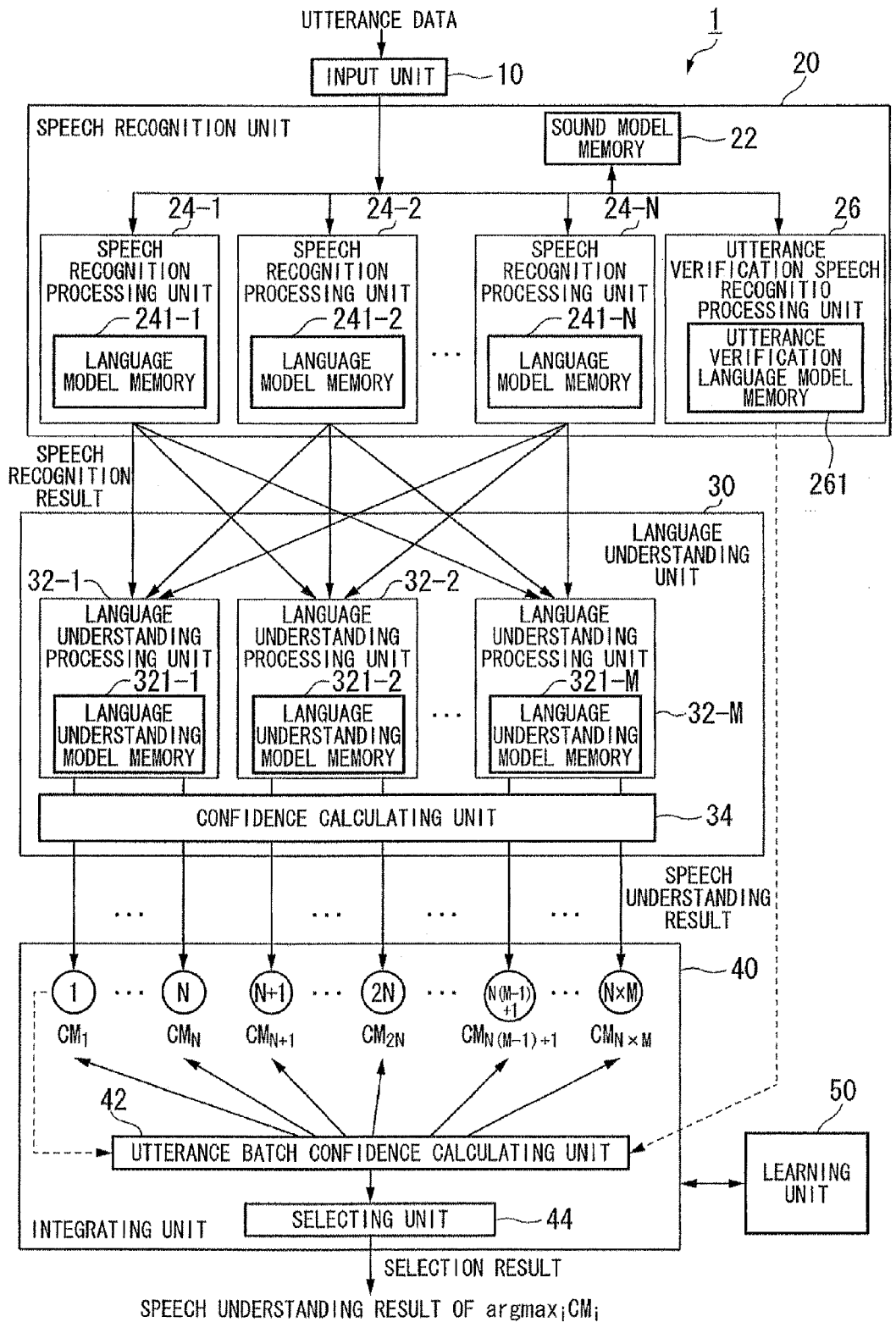

SPEECH UNDERSTANDING APPARATUS USING MULTIPLE LANGUAGE MODELS AND MULTIPLE LANGUAGE UNDERSTANDING MODELS

CROSS REFERENCE TO RELATED APPLICATIONS

This application claims benefit from U.S. Provisional application Ser. No. 61/146,739, filed Jan. 23, 2009, the contents of which are incorporated herein by reference.

BACKGROUND OF THE INVENTION

1. Field of the Invention

The present invention relates to a speech understanding apparatus.

2. Description of Related Art

Speech is promising as a means for accessing to information undergoing an explosive increase in quantity and qualitative complexity, and speech dialogue systems have been developed and operated to make it possible to implement such means. Since a speech dialogue system produces a response based on semantic expressions obtained from utterance of users, speech understanding unit which converts the utterance into the semantic expressions is vital. Speech understanding includes two processes: speech recognition for conversion of speech into word strings, and language understanding for conversion of the word strings into semantic expressions. The speech recognition requires a sound model and a language model, however, the sound model has no dependency on task domains of the speech dialogue systems. Accordingly, a language model and a language understanding model may be considered to be necessary for each domain.

In the case that only a speech understanding scheme according to a single language model and a single language understanding model is employed, it is difficult to realize speech understanding with high accuracy for different utterances. This is because combinations of the appropriate language model and language understanding model are different depending on utterance. For example, if a grammar model is used as a language model of speech recognition, highly-accurate speech recognition for utterance is possible in the grammar. However, this grammar model is weak regarding utterances other than the assumed utterance. An N-gram model has an advantage over the grammar-based language model in that the former has a local restriction and can be easily recovered even if unregistered words or misrecognition occurs. However, since the N-grammar model cannot express restrictions on all sentences, its performance for the assumed utterance is generally lower than that of the grammar-based language model. Similarly, the language understanding model has its advantages and disadvantages, and thus, in order to increase utterances which can be properly understood, a combination of multiple language models and multiple language understanding models is considered to be effective.

Use of multiple speech understanding schemes generates multiple understanding results, and thus it is necessary to obtain a final understanding result from the multiple understanding results. In many cases, a majority voting method such as a ROVER (Recognizer Output Voting Error Reduction) method has been conventionally used (see, for example, Jonathan G. Fiscus, "A post-processing system to yield reduced word error rates: Recognizer Output Voting Error Reduction (ROVER)," Proc. ASRU, pp. 347-354, 1997).

The above ROVER method obtains a final result by performing a weighted majority voting for multiple speech recognition results or multiple understanding results. However, for such majority voting, in some cases, if a scheme with high speech understanding capability is mixed with a scheme with low speech understanding capability, a result of the scheme with higher speech understanding capability may not be sufficiently reflected. For example, if a majority of multiple speech understanding results are incorrect and a minority of multiple speech understanding results are correct, correct speech understanding results are less likely to be obtained.

SUMMARY OF THE INVENTION

In view of such circumstances, it is an object of the present invention to provide a speech understanding apparatus which is capable of understanding utterances of speech with high accuracy.

To achieve the above object, according to a first aspect of the invention, there is provided a speech understanding apparatus including: a speech recognition unit (for example, a speech recognition unit 20 in an embodiment) which performs speech recognition of utterances using multiple language models, and outputs multiple speech recognition results obtained by the speech recognition; a language understanding unit (for example, a language understanding unit 30 in an embodiment) which uses multiple language understanding models to perform language understanding for each of the multiple speech recognition results output from the speech recognition unit; and an integrating unit (for example, an integrating unit 40 in an embodiment) which calculates, based on values representing features of the speech understanding results, utterance batch confidences that numerically express accuracy of the speech understanding results for each of the multiple speech understanding results output from the language understanding unit, and selects one of the speech understanding result with a highest utterance batch confidence among the calculated utterance batch confidences.

With this configuration, speech understanding results for utterances are obtained using all combinations of the multiple language models and the multiple language understanding models, and the utterance batch confidences allowing numerical comparison of the accuracy of the speech understanding results are calculated from the values representing the features of the speech understanding results. In addition, the calculated utterance batch confidences are compared with one another, and one of the speech understanding results having the highest probability of being correct is selected from the obtained speech understanding results using all the combinations of the multiple language models and the multiple language understanding models.

According to a second aspect of the invention, in the speech understanding apparatus of the first aspect, values representing features of the speech understanding results are one or more of values obtained based on utterance length, sound scores obtained when the speech recognition is performed, the number of concepts included in the speech understanding results, confidence of the concepts, whether or not the speech understanding results are obtained, and whether the speech understanding results are positive or negative utterances.

With this configuration, even when different language models and different language understanding models are used, the utterance batch confidences are calculated based on features which can be obtained in common.

According to a third aspect of the invention, in the speech understanding apparatus of the first or second aspect, the speech understanding apparatus further includes a learning unit (for example, a learning unit 50) which determines weights of the values representing the features to provide a maximum likelihood for each of the combinations of the multiple language models and the multiple language understanding models, based on the values representing the features of the speech understanding results obtained from existing utterances and on values representing whether or not the speech understanding results are correct.

With this configuration, based on the values representing the features obtained for learning data and the language understanding results, the weights of the features used for the calculation of the utterance batch confidence are determined depending on the combinations of the multiple language models and the multiple language understanding models.

According to a fourth aspect of the invention, in the speech understanding apparatus of the third aspect, the learning unit selects features having a high correlation with other features for each of the combinations of the multiple language models and the multiple language understanding models, based on the determined weights of the features, and uses one of the selected features to calculate the utterance batch confidence.

With this configuration, the features used for the calculation of the utterance batch confidence are set as independent variables for each of the combinations of the multiple language models and the multiple language understanding models.

According to a fifth aspect of the invention, in the speech understanding apparatus of the third or fourth aspect, the learning unit selects features having less effect on the calculation of the utterance batch confidence for each of the combinations of the multiple language models and the multiple language understanding models, and excludes the selected features from the features used for the calculation of the utterance batch confidence.

With this configuration, according to the combinations of the multiple language models and the multiple language understanding models, the utterance batch confidence is calculated without using features which make no contribution to the calculation of the utterance batch confidence.

According to a sixth aspect of the invention, in the speech understanding apparatus of any one of the third to fifth aspects, the learning unit calculates the utterance batch confidence by a logistic regression equation using the values representing the features for each of the combinations of the multiple language models and the multiple language understanding models.

With this configuration, the utterance batch confidence is calculated by the logistic regression equation to assign weights to features for each of the combinations of the multiple language models and the multiple language understanding models, and the utterance batch confidence to allow a quantitative comparison between combinations of different language models and different language understanding models is obtained.

According to the first aspect of the invention, among the speech understanding results for utterances obtained using all the combinations of the multiple language models and the multiple language understanding models, one of the speech understanding results with the highest utterance batch confidence can be selected without being affected by a model with a low level of performance. Accordingly, speech understanding results with high accuracy can be obtained as compared to when one of the multiple language models and the multiple language understanding models is used.

According to the second aspect of the invention, even when different language models and different language understanding models are used, any language models and any language understanding models can be employed to calculate the utterance batch confidence using features which can be acquired in common.

According to the third aspect of the invention, the weights of the features used to calculate the utterance batch confidence with high accuracy for each of the combinations of the multiple language models and the multiple language understanding models can be determined.

According to the fourth aspect of the invention, multicollinearity can be removed to calculate the utterance batch confidence with high accuracy.

According to the fifth aspect of the invention, the utterance batch confidence can be calculated without using features which make a small contribution to the calculation, thereby lowering the computational process loads.

According to the sixth aspect of the invention, since the utterance batch confidence is calculated by the logistic regression equation, the utterance batch confidence to allow a quantitative comparison between all combinations of different language models and different language understanding models can be calculated with high accuracy.

BRIEF DESCRIPTION OF THE DRAWINGS

FIG. 1 is a functional block diagram of a speech understanding apparatus according to an embodiment of the present invention.

DETAILED DESCRIPTION OF THE INVENTION

Hereinafter, an embodiment of the present invention will be described with reference to the drawings.
(1. Outline of Embodiment of the Invention)

A speech understanding apparatus according to an embodiment of the present invention is assembled to, for example, a speech dialogue system and performs speech understanding with high accuracy by using multiple language models and multiple language understanding models. In this embodiment, speech recognition and language understanding are collectively called "speech understanding" and a speech recognition result obtained using the language model and a language understanding result obtained using the language understanding model are collectively called "speech understanding result." Since combinations of an appropriate language model and language understanding model are different depending on utterance of a user, it is difficult to realize speech understanding with high accuracy for different utterances in a single speech understanding scheme. Therefore, in this embodiment, candidates for speech understanding results are first obtained by obtaining multiple speech understanding results using the multiple language models and the multiple language understanding models. Next, utterance batch confidences are calculated on the obtained multiple speech understanding results based on logistic regression analysis, and one of the speech understanding results having the highest utterance batch confidence is selected.

An evaluation experiment for speech understanding using the speech understanding apparatus according to this embodiment employed a grammar model and an N-gram model as language models and employed a Finite-State Transducer (FST) model, a Weighted FST (WFST) model and a Key Phrase-Extractor model as language understanding models. This evaluation experiment showed that the speech understanding apparatus of this embodiment obtained improved concept understanding accuracy as compared to when either the language models or the language understanding models were used several times. In addition, this evaluation experiment proved the speech understanding apparatus of this embodiment to be effective compared to integrated speech understanding results obtained by the conventional ROVER method.

The speech understanding apparatus of this embodiment employed the following two methods.

(1) Multiple Language models and Multiple Understanding models (MLMU)
(2) Confidence-Measure-Based Selection (CMBS)

MLMU performs speech understanding using all combinations of multiple language models and multiple language understanding models. This enables to obtain speech understanding results according to appropriate combinations of speech recognition and language understanding. CMBS assigns utterance batch confidences to the obtained speech understanding results based on logistic regression analysis and selects an appropriate speech understanding result based on the utterance batch confidences. In the selection, characteristics of speech recognition and language understanding results are used to prevent incorrect speech understanding results from being adopted as a final result.

In the following description, Section 2 shows related researches, Section 3 shows a method of selecting an appropriate one of the multiple output speech understanding results in the speech understanding apparatus of this embodiment, Section 4 shows the language model and the language understanding model employed in the speech understanding apparatus of this embodiment, Section 5 shows a result of the evaluation experiment, and Section 6 shows the conclusion of this embodiment.

(2. Related Research)

So far, several methods using multiple language models and multiple language understanding models have been developed. The following TABLE 1 shows comparison between this embodiment and several conventional methods.

TABLE 1

(Comparison between this embodiment and prior methods)

| | Language Understanding Model | Language Model | Integrated Method |
|---|---|---|---|
| Simple Method | Single | Single | — |
| Method 1, Method 2 | Multiple | — | ROVER Method |
| Method 4 | Multiple | Single | Selection by Decision Tree |
| Method 3 | Single | Multiple | ROVER Method |
| This Embodiment | Multiple | Multiple | CMBS |

As shown in TABLE 1, in many cases, speech recognition and language understanding have been separately researched in the prior art. However, although the speech recognition and the language understanding may be enhanced separately, inappropriate combinations thereof cannot ensure the overall performance improvement of speech understanding.

Prior Method 1 is described in Jonathan G. Fiscus, "A post-processing system to yield reduced word error rates: Recognizer Output Voting Error Reduction (ROVER)," Proc. ASRU, pp. 347-354, 1997 and prior Methods 2 to 4 are respectively described in the following Documents 2 to 4.

Document 2 (Method 2): H. Schwenk and J.-L. Gauvain, "Combining Multiple Speech Recognizers using Voting and Language Model Information," Proc. ICSLP, pp. 915-918, 2000

Document 3 (Method 3): S. Hahn, P. Lehnen. and H. Ney, "System Combination for Spoken Language Understanding," Proc. Interspeech, pp. 236-239, 2008

Document 4 (Method 4): Norihito YASUDA, Koji DOUSAKA and Kiyoaki AIKAWA, "Initiative hybrid dialogue control using two recognition grammars," Research Report of Information Processing Society of Japan, pp. 127-132, 2002-SLP-40-22, 2002

In addition, methods using multiple language models are under development for utterance verification (for example, see Documents 5 and 6). These methods perform speech recognition using a language model having large sized vocabularies for utterance verification of speech recognition results and measure confidence of the speech recognition results by comparing sound likelihoods or the like. However, in these methods, speech recognition results used for language understanding are only results based on a single language model.

Document 5: Masafumi NISHIDA, Hiromasa TERASHI, Yasuo HORIUCHI, Akira ICHIKAWA, "Speech dialogue system based on prediction of user utterance," Research Report of Information Processing Society of Japan, pp. 307-312, 2004-SLP-12-22, 2004

Document 6: Kazunori KOMATANI, Yuichiro FUKUBA-YASHI, Tetsuya OGATA, and Hiroshi G. OKUNO, "Introducing Utterance Verification in Spoken Dialogue System to Improve Dynamic Help Generation for Novice Users," Proc. $8^{th}$ SIG-dial Workshop on Discourse and Dialogue, pp. 202-205, 2007

Method 1 described in Jonathan G. Fiscus, "A post-processing system to yield reduced word error rates: Recognizer Output Voting Error Reduction (ROVER)," Proc. ASRU, pp. 347-354, 1997 and Method 2 described in Document 2 use multiple different language models. Methods 1 and 2 aim only at improvement of speech recognition and do not deal with language understanding. Method 4, described in Document 4, performs speech recognition using two language models and builds a decision tree for determining which recognition result to be used. The decision tree requires speech understanding schemes to be uniquely determined as a correct solution label for each utterance in learning. However, it may not be possible for this method to uniquely determine the correct solution label since multiple speech understanding schemes frequently outputs the same result in many cases.

There are researches using multiple language understanding models. Method 3 described in Document 3 outputs language understanding results using multiple language understanding models for any speech recognition results and outputs a final understanding result using a ROVER method. However, in Method 3, a single language model is used for speech recognition.

TABLE 2 shows examples when speech understanding is performed using multiple language models and multiple language understanding models.

TABLE 2

(Example when multiple language models and multiple language understanding models are used to perform speech understanding)

U1: It's June 9.
("ro-ku-ga-tsu-ko-ko-no-ka-de-su", in Japanese pronunciation)
Speech recognition result:

Grammar "It's June 9."
("ro-ku-ga-tsu-ko-ko-no-ka-de-su", in Japanese pronunciation)
N-grammar "It's afternoon on June."
("ro-ku-ga-tsu-go-go-no-ga-de-su", in Japanese pronunciation)
Speech understanding result:

TABLE 2-continued (Example when multiple language models and
multiple language understanding models are
used to perform speech understanding)

"Grammar + FST: "month: 6 day: 9 type: refer-time"
N-gram + WFST: "month: 6 type: refer-time"
U2: will borrow on the 20th (Underlined portion is outside grammar)
("ha-tsu-ka-ni-o-ka-ri-shi-ma-su", in Japanese pronunciation)
Speech recognition result:

Grammar "Around 2 o'clock on 20th."
("ha-tsu-ka-ni-ji-go-ro-de-su", in Japanese pronunciation)
N-grammar "On 20th + 2 o'clock."
("ha-tsu-ka-ni-ju-u-ni-chi-ni-ji-ma-su", in Japanese pronunciation)
Speech understanding result:

Grammar + FST: "day: 20 hour: 14 type: refer-time"
N-gram + WFST: "day: 20 type: refer-time"

In TABLE 2, combinations of language models and language understanding models are represented by "language model+language understanding model." Speech understanding results are a set of concepts, each of which consists of a meaning slot, its value and utterance type. In TABLE 2, "month," "day" and "hour" correspond to the meaning slot and their values follow ":" behind the meaning slot. For example, "month: 6" indicates that a value of the meaning slot "month" is "6." The utterance type follows ":" behind "type."

As shown in TABLE 2, since utterance U1 "It is June 9." is an utterance in accordance with grammar, a result obtained by performing speech recognition using a grammar model and performing language understanding using FST is likely to be a correct solution. On the contrary, since utterance U2 "will borrow on the 20th." is an utterance outside grammar, using an N-gram model, which is a local restriction, increases recognition accuracy. In addition, when a language understanding unit uses WFST, it is possible to convert recognition results into a stream of concepts which are internal expressions, i.e., meaning expressions, of the system while rejecting words unnecessary for language understanding or words having low word confidence in speech recognition. In this manner, by using the multiple speech understanding schemes, it is possible to obtain correct speech understanding results for both of utterances U1 and U2.

(3. Selection of Speech Understanding Result Based on Utterance Batch Confidence)

In this section, a configuration of a speech understanding apparatus according to an embodiment of the present invention will be first described. FIG. 1 shows a functional block diagram of a speech understanding apparatus 1 according to an embodiment of the present invention.

In the FIGURE, the speech understanding apparatus 1 includes an input unit 10, a speech recognition unit 20, a language understanding unit 30, an integrating unit 40 and a learning unit 50.

The input unit 10 receives utterance data. The utterance data are sound data of an utterance by a user. For example, the input unit 10 may receive the utterance data from another apparatus connected to the speech understanding apparatus 1 by a wire or by a wireless connection or may read the utterance data from a computer readable recording medium.

The speech recognition unit 20 includes a sound model memory 22, speech recognition processing units 24-1 to 24-N (N is an integer equal to or greater than 2) and an utterance verification speech recognition processing unit 26.

The sound model memory 22 stores a sound model which is a statistic model representing sound characteristics of a string of words.

Any speech recognition processing unit 24-k (k is an integer equal to or greater than 1 and equal to or smaller than N) includes any language model memory 241-k storing a domain-dependent language model. Different language model memories 241-1 to 241-N store different language models. A language model is a set of rules used to obtain sound scores or combination probability of a string of words obtained based on speech waveforms of the sound data and a statistic model for natural languages.

The speech recognition processing unit 24-k speech-recognizes the utterance data input to the input unit 10 using the sound model stored in the sound model memory 22 and the language model stored in its own language model memory 241-k and outputs speech recognition results. The speech recognition processing by the speech recognition processing units 24-1 to 24-N may be a conventional speech recognition processing using a domain-dependent language model. The speech recognition processing units 24-1 to 24-N output the speech recognition results represented by the string of words and the sound scores and combination probability for the string of words of the speech recognition results to the language understanding unit 30. The string of words is assumed to include one word.

The utterance verification speech recognition processing unit 26 includes an utterance verification language model memory 261 storing an utterance verification language model. An utterance verification language model is a language model using a large vocabulary statistic model which does not depend on a particular domain. The utterance verification speech recognition processing unit 26 speech-recognizes the utterance data input to the input unit 10 using the sound model stored in the sound model memory 22 and the utterance verification language model stored in the utterance verification language model memory 261 and outputs speech recognition results. The speech recognition processing by the utterance verification speech recognition processing unit 26 may be a conventional speech recognition processing using the large vocabulary statistic model. The utterance verification speech recognition processing unit 26 outputs the speech recognition results represented by the string of words and the sound scores and combination probability for the string of words of the speech recognition results to the integrating unit 40.

The language understanding unit 30 includes language understanding processing units 32-1 to 32-M (M is an integer equal to or greater than 2) and a confidence calculating unit 34. A language understanding processing unit 32-j (j is an integer equal to or greater than 1 and equal to or smaller than M) includes a language understanding model memory 321-j storing a language understanding model. A language understanding model is a set of rules for obtaining a concept from a string of words. Different language understanding model memories 321-1 to 321-M store different language understanding models. The language understanding processing unit 32-j language-understands N speech recognition results output by the speech recognition processing units 24-1 to 24-N using the language understanding model stored in the language understanding model memory 321-j and obtains speech understanding results, each of which is a set of concepts. The language understanding processing by the language understanding processing units 32-1 to 32-M may be a conventional language understanding processing.

The confidence calculating unit 34 calculates confidence of the concepts included in each speech understanding result, according to a predetermined rule, for each of N×M speech understanding results obtained when each of the language understanding processing units 32-1 to 32-M language-understands the N speech recognition results output from the speech recognition processing units 24-1 to 24-N. The confidence of the concepts may be calculated using an existing technique. The confidence calculating unit 34 outputs the speech understanding results as well as the number of concepts included in the speech understanding results and the calculated confidence of the concepts, which are features of the speech understanding results, and sound scores of the speech recognition results used for speech understanding.

The integrating unit 40 includes an utterance batch confidence calculating unit 42 and a selecting unit 44. The utterance batch confidence calculating unit 42 calculates an utterance batch confidence of each speech understanding result from a value representing a characteristic, i.e., a feature, of each of the N×M speech understanding results output from the confidence calculating unit 34. The selecting unit 44 selects and outputs one of the speech understanding results having the highest utterance batch confidence calculated by the utterance batch confidence calculating unit 42. For example, the selected speech understanding result may be output to a different application executing unit (not shown), displayed on a display (not shown), printed on a sheet or the like, transmitted to another apparatus connected to the speech understanding apparatus 1 by a wire or wirelessly, or written into a computer readable recording medium. In addition, the selecting unit 44 may output a predetermined number of speech understanding results and their utterance batch confidences in an ascending order of utterance batch confidences.

The learning unit 50 selects a feature used by the utterance batch confidence calculating unit 42 to calculate the utterance batch confidence using learning data and determines the weight of the selected feature.

The above-described speech understanding apparatus 1 has a computer system therein. The operational procedures of the speech recognition unit 20, language understanding unit 30, integrating unit 40 and learning unit 50 of the speech understanding apparatus 1 are stored in the form of a program in a computer readable recording medium and are performed when the computer system reads out and executes the program. The computer system used herein is meant to include a CPU, various kinds of memories, an OS, other hardware such as peripheral devices and the like, and so on.

Furthermore, "computer system" is meant to include homepage providing environments (or display environments) if it uses a WWW system.

"Computer readable recording medium" refers to a movable medium such as a flexible disc, magneto-optical disc, ROM, CD-ROM or the like, a storage device such as a hard disc or the like contained in the computer system. Furthermore, "computer readable recording medium" is meant to include a medium dynamically retaining a program in a short time, such as a communication line for transmission of the program, for example, a network such as the Internet or the like, a telephone line, and so on, and a medium retaining the program for a certain period of time, such as an internal volatile memory of the computer system which becomes a server or a client in that case. In addition, the program may be used to implement some of the above-described functions or a combination of programs already recorded in the computer system may be used.

In the above configuration, the speech recognition processing unit 24-k (k is an integer equal to or greater than 1 and equal to or smaller than N) uses the sound model stored in the sound model memory 22 and the language model stored in its own language model memory 241-k and the utterance verification speech recognition processing unit 26 uses the sound model stored in the sound model memory 22 and the utterance verification language model stored in the utterance verification language model memory 261 to speech-recognize the utterance data input to the input unit 10 and output speech recognition results. The language understanding processing unit 32-j (j is an integer equal to or greater than 1 and equal to or smaller than M) uses the language understanding model stored in the language understanding model memory 321-j to language-understand the N speech recognition results output by the speech recognition processing units 24-1 to 24-N and output speech understanding results.

Hereinafter, for each utterance, each of the N×M speech understanding results output by combinations of the N language models used by the speech recognition processing units 24-1 to 24-N and the M language understanding models used by the language understanding processing units 32-1 to 32-M is referred to as a speech understanding result i ($i=1, \ldots, n$; $n=N \times M$). In addition, a combination of a speech recognition model and a language understanding model used to obtain the speech understanding result i is referred to as speech understanding scheme i. For example, speech understanding results obtained when the language understanding processing unit 32-1 uses the speech recognition results of the speech recognition processing units 24-1 to 24-N are respectively referred to as speech understanding results 1 to N, speech understanding results obtained when the language understanding processing unit 32-2 uses the speech recognition results of the speech recognition processing units 24-1 to 24-N are respectively referred to as speech understanding results (N+1) to 2N, . . . , and speech understanding results obtained when the language understanding processing unit 32-M uses the speech recognition results of the speech recognition processing units 24-1 to 24-N are respectively referred to as speech understanding results (N(M−1)+1) to (N×N).

In this embodiment, a meaning expression as the speech understanding results is a set of concepts, each of which consists of a meaning slot, its value set and utterance type. The representation of the speech understanding results as the set of concepts is described in, for example, Document 7.

Document 7: J. Glass, J. Polifroni, S. Seneff and V. Zue, "DATA COLLECTION AND PERFORMANCE EVALUATION OF SPOKEN DIALOGUE SYSTEMS: THE MIT EXPERIENCE," Prod. ICSLP, pp. 1-4, 2000.

The utterance batch confidence calculating unit 42 of the integrating unit 40 assigns utterance batch confidence $CM_i$ representing confidence of a correct solution to the speech understanding result i for one utterance. Here, that a speech understanding result is a correct solution means that an utterance understanding result is perfectly correct, that is, an incorrect concept is not contained in the speech understanding result.

Next, the selecting unit 44 of the integrating unit 40 selects one of the speech understanding results assigned with the highest utterance batch confidence by the utterance batch confidence calculating unit 42, and obtains and outputs a final speech understanding result for the corresponding utterance. That is, the selected result becomes the speech understanding result i obtained as $\mathrm{argmax}_i CM_i$. The utterance batch confidence is calculated by a logistic regression equation based on characteristics in speech understanding. The logistic regression equation is built by the learning unit 50 based on the following Equation (1) for each speech understanding scheme i.

$$CM_i = \frac{1}{1+\exp(-(a_{i1}F_{i1}+\ldots+a_{im}F_{im}+b_i))} \quad (1)$$

The learning unit 50 determines appropriate coefficients (i.e., weights) $a_{i1}, \ldots, a_{im}$ and an intercept $b_i$ for the speech understanding scheme i based on the speech understanding results obtained in a manner similar to the above using learning data which are existing utterance data. In addition, features $F_{i1}, F_{i2}, \ldots, F_{im}$, which are independent variables related to the speech understanding i, are features shown in the following TABLE 3. Features as values common to the speech understanding schemes 1 to n do not include i in their subscripts.

TABLE 3

(Feature related to speech understanding result i)

$F_{i1}$: Sound score in speech recognition related to speech understanding result i
$F_{i2}$: Difference between sound score when $F_{i1}$ and an utterance verification language model are used
$F_{i3}$: Difference between sound score when $F_{i1}$ and a language model other than utterance verification language model are used
$F_4$: Utterance time (second)
$F_{i5}$: Arithmetic mean of confidences of concepts based on a posteriori probability
$F_{i6}$: Maximum value in speech understanding result i of confidence of concept based on posteriori probability
$F_{i7}$: Minimum value in speech understanding result i of confidence of concept based on a posteriori probability $F_8$: Arithmetic mean of $F_{i5}\left(\frac{1}{n}\sum_i^n F_{i5}\right)$ $F_{i9}$: Ratio of $F_{i5}$ to arithmetic mean ($F_{i5}/F_8$)
$F_{i10}$: Number of concepts included in speech understanding result i
$F_{11}$: Maximum value of the number of concepts in speech understanding results 1 to n
$F_{12}$: Minimum value of the number of concepts in speech understanding results 1 to n $F_{13}$: Arithmetic mean of $F_{i10}\left(\frac{1}{n}\sum_i^n F_{i10}\right)$ $F_{i14}$: Ratio of $F_{i10}$ to arithmetic mean ($F_{i10}/F_{13}$)
$F_{i15}$: Didn't obtain speech understanding results?
$F_{i16}$: Do speech understanding results represent positive/negative utterances?

In order to determine the features $F_{i1}, \ldots, F_{im}$, the coefficients, i.e., the weights thereof, $a_{i1}, \ldots, a_{im}$, and the intercept $b_i$, first, the speech recognition unit 20 and the language understanding unit 30 of the speech understanding apparatus 1 perform the same speech understanding as when the utterance data are input using the learning data, and the utterance batch confidence calculating unit 42 of the integrating unit 40 calculates the features $F_{i1}, F_{i2}, \ldots, F_{im}$ as the above independent variables for each speech understanding result i obtained from the learning data. In addition, for each of the sets of independent variables (features) calculated by the utterance batch confidence calculating unit 42, 1 is given as an input manually if the speech understanding result is a correct solution and 0 is given as an input manually if the speech understanding result is an incorrect solution, thereby constructing a sample set, and the learning unit 50 finds the coefficients $a_{i1}, \ldots, a_{im}$ and the intercept $b_i$ to cause the logarithm likelihood of the sample set to be maximal by a maximum likelihood estimation method or the like.

The features used in the above will be described. The feature $F_{i1}$ to the feature $F_4$ are features obtained from the speech recognition results by the speech recognition processing units 24-1 to 24-N. The sound scores are normalized to utterance time. The feature $F_{i1}$ is a likelihood in speech recognition based on the language model used when the speech understanding results of an utterance batch confidence calculation object are obtained. The feature $F_{i2}$ and the feature $F_{i3}$ are for comparison with the sound scores when a language model different from the model used in speech understanding is used. These features represent the confidence of the speech recognition results. The feature $F_4$ was introduced in consideration of the possibility of variation of speech recognition performance due to an utterance length.

For example, assume that the speech recognition result i of the utterance batch confidence calculation object is a result obtained when the language understanding processing unit 32-j performs language understanding processing using the speech recognition results by the speech recognition processing unit 24-k. The feature $F_{i1}$ is a sound score of the speech recognition result by the speech recognition processing unit 24-k and the feature $F_{i2}$, is a value obtained by subtracting a sound score of the speech recognition result by the utterance verification speech recognition processing unit 26 from the sound score of the speech recognition result by the speech recognition processing unit 24-k. The feature $F_{i3}$ is the largest one of values obtained by subtracting each of the sound scores of speech recognition results by the speech recognition processing units 24-1 to 24-N, except the speech recognition processing unit 24-k, from the sound score of the speech recognition result by the speech recognition processing unit 24-k, that is, the largest absolute value among values of (sound score of the speech recognition result by the speech recognition processing unit 24-k)−(sound score of the speech recognition result by the speech recognition processing unit 24-1), (sound score of the speech recognition result by the speech recognition processing unit 24-k)−(sound score of the speech recognition result by the speech recognition processing unit 24-2), . . . , (sound score of the speech recognition result by the speech recognition processing unit 24-k)−(sound score of the speech recognition result by the speech recognition processing unit 24-N). $F_4$ is acquired from the input utterance data in the speech recognition unit 20.

The feature $F_{i5}$ to the feature $F_{i9}$ are features related to the confidence of concept units calculated based on a posteriori probability of the speech understanding results by the language understanding processing units 32-1 to 32-M. The feature $F_{i5}$ is the arithmetic mean of the confidences of all concepts included in the speech understanding result i. The feature $F_{i6}$ is the maximum value of the confidences of concepts included in the speech understanding result i, and the feature $F_{i7}$ is the minimum value of the confidences of concepts included in the speech understanding result i. The feature $F_8$ is the arithmetic mean of $F_{i5}$ for the speech understanding results i to n, and the feature $F_{i9}$ is the ratio of the feature $F_{i5}$ to the feature $F_8$.

The feature $F_{i10}$ to the feature $F_{i14}$ are features related to the number of concepts of speech understanding results. Utterance time of utterances outside grammar tends to be prolonged, and in such a case, understanding results based on the grammar model are very unlikely to be a correct solution. The feature $F_{i10}$ is the number of concepts included in the speech understanding result i, the feature $F_{11}$ is the maximum value of the number of concepts included in each of the speech understanding results 1 to n, and the feature $F_{12}$ is the minimum value of the number of concepts included in each of the speech understanding results 1 to n. The feature $F_{13}$ is the arithmetic mean of $F_{i10}$ for the speech understanding results 1 to n, and the feature $F_{i14}$ is the ratio of the feature $F_{i10}$ to the feature $F_{13}$.

The feature $F_{i15}$ takes one of two values depending on whether or not a speech understanding result is obtained. The feature $F_{i15}$ is used to detect that the language understanding processing units 31-1 to 32-M could not accept the speech recognition result. Depending on a language understanding model, the speech understanding result cannot be output if the unacceptable speech recognition result is input. In such a case, the speech understanding result cannot be a correct solution.

The feature $F_{i16}$ takes one of binary values depending on whether a speech understanding result is a positive utterance or a negative utterance. The feature $F_{i16}$ was introduced in consideration of the fact that speech understanding with relatively high accuracy is possible for a positive/negative utterance. Specifically, a value of the feature $F_{i16}$ can be determined depending on whether or not an utterance type or a slot value of a preset positive or negative expression is included in one of concepts included in the speech understanding result i.

The learning unit 50 standardizes the feature amount of the features $F_{i1}, F_{i2}, \ldots, F_{im}$, used in the logistic regression equation to be 0 in average and 1 in variance. In addition, the learning unit 50 removes features having high correlation from the features $F_{i1}, F_{i2}, \ldots, F_{im}$. In this embodiment, features having a correlation coefficient equal to or greater than 0.9 were removed, in order to remove multicollinearity in order to increase absolute values of coefficients of features of a learning result in an order of effective features.

Details of the process of removing features having high correlation will be described below.

For the sake of simplicity, a case where a feature having high correlation is removed from four features A, B, C and D will be described by way of example.

First, the learning unit 50 calculates correlation coefficients of all combinations of the features A, B, C and D. In addition, the learning unit 50 also calculates correlation coefficients of all features and true values (0 or 1) of confidence. Based on these calculated correlation coefficients, the learning unit 50 prepares the following matrix having correlation coefficients of the features A, B, C and D and confidence as its elements. In addition, correlation coefficients having a threshold equal to or greater than 0.9 to determine a correlation function to be high are assigned "#."

TABLE 4

(Correlation of true values of features A to D and confidence)

| | Feature A | Feature B | Feature C | Feature D | True value of confidence |
|---|---|---|---|---|---|
| Feature A | #1.00 | #0.90 | −0.16 | 0.01 | 0.10 |
| Feature B | #0.90 | #1.00 | 0.39 | 0.46 | 0.19 |
| Feature C | −0.16 | 0.39 | #1.00 | #0.95 | 0.20 |
| Feature D | 0.01 | 0.46 | #0.95 | #1.00 | 0.17 |
| True value of confidence | 0.10 | 0.19 | 0.20 | 0.17 | #1.00 |

In this case, the correlation between the feature A and the feature B is 0.90 and the correlation between the feature C and the feature D is 0.95, both of which are determined to be high. In this case, one having lower correlation with a true value of confidence of two features having high correlation is removed. Specifically, since the correlation coefficient between the feature A and correct solution confidence is 0.10 and the correlation coefficient between the feature B and correct solution confidence is 0.19, one having higher correlation with the correct solution confidence is the feature B. Accordingly, the feature A is removed while the feature B is left. The same operation is performed for the feature C and the feature D such that the feature D is removed while the feature C is left.

While the four features have been illustrated in the above, features having high correlation may be detected from five or more features using a correlation coefficient matrix as described above. In this manner, the learning unit 50 prepares the above same matrix from correlation coefficients between the features $F_{i1}, F_{i2}, \ldots, F_{im}$ and the true values of confidence, detects two features having correlation higher than a predetermined threshold, and leaves one having the highest coefficient of correlation with the true values of confidence of the two features, while removing the remaining feature.

The threshold of the correlation function is just one example and may be set by a user.

In addition, the learning unit 50 selects a feature for each speech understanding scheme. More specifically, the learning unit 50 selects a feature having a less effect on calculation of utterance batch confidence and excludes the selected feature from features used for the calculation of utterance batch confidence. Such feature selection is performed by a variable reduction method. That is, an equation for removing features correlating as the above is generated as a full model from Equation (1) using the coefficients $a_{i1}, \ldots, a_{im}$ and the intercept $b_i$ determined by the maximum likelihood estimation method or the like. Features are removed one by one from the full model equation, and features with utterance batch confidence accuracy not lower than a predetermined level are excluded from the features used for calculation of utterance batch confidence.

When the utterance batch confidence calculating unit 42 calculates CMi of the speech understanding result i, it calculates the utterance batch confidence according to an equation leaving only terms of features selected as above from Equation (1) applying the coefficients $a_{i1}, \ldots, a_{im}$ and the intercept $b_i$ determined by the maximum likelihood estimation method or the like. The utterance batch confidence of the speech understanding result i calculated according to this equation is denoted by $X_{ie}$.

An evaluation measure for the utterance batch confidence of the speech understanding result is a mean absolute error (MAE) with a true value (0 or 1) of confidence. MAE is obtained according to the following Equation (2).

$$MAE = \left(\frac{1}{n}\sum_{i}^{n} |X_{ie} - X_{ia}|\right) \quad (2)$$

MAE represents the mean of errors per utterance of expected value and correct solution. Here, n is the total number of utterances. $X_{ie}$ represents estimated confidence for the speech understanding result i of $i^{th}$ utterance and $X_{ia}$ represents a true value (0 or 1) of utterance batch confidence. $X_{ia}$ was manually given.

(4. Embodiment)
(4.1 Employed Language Model and Language Understanding Model)

An example of MLMU for implementing the language understanding apparatus 1 of this embodiment includes two general kinds of language models and three kinds of language understanding models used in a rental car reservation system described in Document 8.

Document 8: M. Nakano, Y. Nagano, K. Funakoshi, T. Ito, K. Araki, Y. Hasegawa, and H. Tusujino, "Analysis of User Reactions to Turn-Talking Failures in Spoken Dialogue Systems," Proc. 8th SIGdial Workshop on Discourse and Dialogue, pp. 120-123, 2007

Each of the speech recognition processing units 24-1 to 24-N (N=2 in this example) employed the following language models.

(1) Grammar-based language model (grammar model)
(2) Domain-dependent statistic language model (N-gram model)

A grammar model in a rental car reservation system was manually described in correspondence to FST used for language understanding. An N-gram model was prepared by learning class 3-gram using opening words of learning data. Vocabulary size is 278 for grammar model and 378 for N-gram model. A speech recognition unit used a speaker-nondependent PTM Try Phone model described in Document 9 as a sound model which is a speech waveform pattern for each phoneme using Julius (vor.4.1.2). The accuracy of words in the correct solution in speech recognition obtained when the grammar and N-grain models were respectively used was 68.1% and 87.5% for learning data and respectively 72.3% and 86.9% for evaluation data.

In addition, a domain-nondependent large vocabulary statistic language model was used as a language model for verifying speech recognition results, that is, a language model realized in the utterance verification speech recognition processing unit 26. A word N-gram model learned from Web sentences, which is distributed by Continuous Speech Recognition Consortium (CSRC), was used as the domain-nondependent large vocabulary statistic language model. Vocabulary size was 60,250 (see Document 9).

Document 9: T. Kawahara, A. Lee, L. Takeda, K. Itou, and K. Shikano, "Recent Progress of Open-Source LVCSR Engine Julius and Japanese Model Repository," Proc. ICSLP, pp. 3069-3072, 2004

The language understanding processing units 31-1 to 32-M (M=3 in this example) employed the following three kinds of language understanding models.

(1) Finite-State Transducer (FST)
(2) Weighted FST (WFST)
(3) Key Phrase-Extractor (Extractor)

FST is obtained by giving an output to finite-state automation and outputs a string of symbols given to state transition performed according to a string of input. In language understanding by FST, FST is manually prepared and language understanding results are obtained by inputting a string of words of speech recognition results to the FST. In FST prepared in the rental car reservation system, the number of words that can be input is 278 and coverage was 81.3% for learning data and 86.0% for evaluation data. The 10-best candidates of speech recognition results are used as inputs and acceptable recognition results are searched in FST in an order from the first-ranked one of the 10-best candidates. If all the 10-best candidates were unacceptable, no language understanding result can be output.

Language understanding by WFST is based on a method described in, for example, Document 10. WFST further adds a weight to FST state transition and outputs an accumulation of a string of symbols given to the state transition according to a string of inputs and weights corresponding to these symbols. WFST described in Document 10 abstractizes speech recognition results as fillers, words, concepts or the like, and assigns them weights using the number of phonemes and the confidence of speech recognition. WFST is constructed using MITToolkit described in Document 11. Here, an interpretation to ignore words unnecessary for language understanding is allowable by adding filler transition to FST. The 10-best candidates of the speech recognition results are converted into strings of concepts by WFST, and a string of concepts having the maximum accumulative weight is taken as a language understanding result. The kind of weight assignment used is selected using learning data, as described in Document 10. In language understanding by WFST, the introduction of the filler transition allows language understanding results to be output even for speech recognition results unacceptable in FST. In addition, since word confidence in speech recognition is used for weighting, language understanding by WFST is robust regarding speech recognition errors.

Document 10: Yuichiro FUKUBAYASHI, Kazunori KOMATANI, Mikio NAKANO, Kotaro FUNAKOSHI, Hirokoji TSUJINO, Tetsuya OGATA, Hiroshi OKUNO, "Rapid prototyping-oriented language understanding in a speech dialogue system," Journal of Information Processing Society of Japan, vol. 49, no.8, pp. 2762-2772, 2008

Document 11: L. Hetherington, "The MIT Finite-State Transducer Toolkit for Speech and Language Processing," Proc. ICSLP, pp. 2609-2612, 2004

In language understanding by Extractor, for the first-ranked candidate of speech recognition results, a partial string of speech recognition results which can be converted into concepts is simply converted into the concepts. However, if there is a contradiction between the converted concepts, a combination of concepts having no contradiction is output in a manner to maximize the number of output concepts. The contradiction between the concepts was detected using FST. The language understanding by Extractor allows language understanding results to be output even for speech recognition results unacceptable in FST. However, even if errors are included in the speech recognition results, the speech recognition results are converted into a string of concepts as they are.

The confidence calculating unit 34 assigns confidence to each of the concepts of the language understanding results obtained by the language understanding processing units 32-1 to 32-M. The 10-best candidates of the speech recognition results are used to calculate and use confidence for each concept based on the method described in Document 12.

Specifically, the confidence is calculated as follows. That is, an inverse document frequency (IDF) is calculated for slots included in each concept. Next, the sum of IDFs of the slots included in each concept is calculated and the calculated sum is normalized to obtain the confidence.

Document 12: Kazunori KOMATANI and Tatsuya KAWAHARA, "Dialogue management for efficient verification/inducement using confidence of speech recognition results," Journal of Information Processing Society of Japan, vol. 43, no.10, pp. 3078-3086, 2002

(4.2 Confidence Evaluation Based on Logistic Regression Equation)

The calculated utterance batch confidence was evaluated based on a logistic regression equation. In order to correctly select correct solution understanding results, an appropriate utterance batch confidence is required to be assigned to each understanding result.

Dialogue data used for the evaluation experiment for utterance batch confidence were collected by imposing a simple rental car reservation task on 33 subjects and interacting with the rental car reservation system described in Document 8. As a result, 4,986 utterances were collected. Among the collected utterances, 4,513 utterances in which an utterance section detected by the rental car reservation system coincides with a manually assigned utterance section were used for the experiment. This is for excluding VAD errors or utterances having no relation to the task, which are not the object of this embodiment. Among 4,513 utterances, 2,193 utterances of 16 subjects were taken as learning data and 2,320 utterances of the remaining 17 subjects were taken as evaluation data. As a result of using the learning data by a feature selecting unit 50 to remove features having high correlation and select features, TABLE 5 shows features selected from 16 features shown in TABLE 3.

TABLE 5

(Selected feature)

| Speech understanding scheme | Selected feature |
|---|---|
| Grammar + FST | $F_{i1}, F_{i2}, F_{i3}, F_4, F_8, F_{i9}, F_{11}, F_{12}, F_{i15}, F_{i16}$ |
| Grammar + WFST | $F_{i1}, F_{i2}, F_{i3}, F_4, F_{i7}, F_8, F_{i9}, F_{11}, F_{12}, F_{i15}, F_{i16}$ |
| Grammar + Extractor | $F_{i1}, F_{i2}, F_{i3}, F_4, F_{i7}, F_8, F_{i9}, F_{11}, F_{12}, F_{i15}, F_{i16}$ |
| N-gram + FST | $F_{i1}, F_{i2}, F_4, F_{i7}, F_8, F_{11}, F_{12}, F_{i15}, F_{i16}$ |
| N-gram + WFST | $F_{i1}, F_{i2}, F_4, F_{i7}, F_8, F_{i9}, F_{11}, F_{12}, F_{i16}$ |
| N-gram + Extractor | $F_{i1}, F_{i2}, F_{i3}, F_4, F_{i7}, F_8, F_{i9}, F_{11}, F_{12}, F_{i16}$ |

As shown in TABLE 5, among features related to speech understanding schemes of N-gram+Extractor, since feature $F_{i10}$ representing the number of concepts and feature $F_{13}$ representing the arithmetic mean of the number of concepts have high correlation with feature $F_{11}$ representing the maximum value of the number of concepts, the features $F_{i10}$ and $F_{13}$ were excluded by the learning unit 50. In addition, since feature $F_{i5}$ representing the arithmetic mean of confidence of concepts based on a posteriori probability and feature $F_{i6}$ representing the maximum value of concept confidence have high correlation with feature $F_{i7}$ representing the minimum value of the number of concept confidence, the features $F_{i5}$ and $F_{i6}$ were excluded by the learning unit 50. In addition, as a result of feature selection by a variable reduction method, three features, i.e., feature $F_{i9}$ representing a ratio of feature $F_{i5}$ to the arithmetic mean, feature $F_{i14}$ representing a ratio of feature $F_{i10}$ to the arithmetic mean, and feature $F_{i15}$ representing that no speech understanding result is obtained, were excluded by the learning unit 50. In this manner, using the logistic regression equation having the features selected by the learning unit 50 as independent variables, the speech understanding results of evaluation data were assigned utterance batch confidence.

TABLE 6 shows the MAE of the utterance batch confidence for results of each speech understanding scheme.

TABLE 6

(MAE of utterance batch confidence based on logistic regression equation)

| Speech understanding scheme | logistic regression | Expect |
|---|---|---|
| Grammar + FST | 0.146 | 0.333 |
| Grammar + WFST | 0.159 | 0.331 |
| Grammar + Extractor | 0.147 | 0.334 |
| N-gram + FST | 0.093 | 0.337 |
| N-gram + WFST | 0.146 | 0.284 |
| N-gram + Extractor | 0.135 | 0.280 |

In TABLE 6, a column of logistic regression shows the MAE of the utterance batch confidence calculated by the utterance batch confidence calculating unit 42 based on the logistic regression equation and a column of Expect shows the MAE of expected values of the utterance batch confidence in learning data as a base line. Here, the MAE of the expected value of the utterance batch confidence in the learning data refers to an error with a true value of the utterance batch confidence when a proportion at which a result according to each speech understanding scheme in learning data is a correct solution is assumed as an estimated confidence. In TABLE 6, for the results of all speech understanding schemes, the MAE of the utterance batch confidence in this example is smaller than the MAE of the expected value of the utterance batch confidence. That is, the MAE of the utterance batch confidence in this example can be said to show high performance as a model predicting confidence. This is an effect of building the logistic regression equation using features representing the accuracy of speech understanding results, such as a sound score, concept confidence based on, for example, the a posteriori probability. The MAE of the utterance batch confidence for understanding results of N-gram+FST is smallest at 0.093. This was because, for N-gram+FST, speech recognition results unacceptable in FST are input and low utterance batch confidence can be assigned if language understanding results cannot be output.

Coefficients of the logistic regression equation were examined to determine how the features used are effective in calculating the utterance batch confidence. Since values of the features are standardized, the effectiveness of the features can be verified by comparing the sizes of absolute values of the coefficients. TABLE 7 shows 5 upper level features having large absolute values of the coefficients and the values of the coefficients for each logistic regression equation built for each speech understanding scheme.

TABLE 7

(Feature having large absolute value of coefficient and value of the coefficient in each regression equation)

| Grammar + FST | |
|---|---|
| $F_{i2}$ | 7.37 |
| $F_{i15}$ | −5.51 |
| $F_{i3}$ | 2.14 |
| $F_{11}$ | −1.91 |
| $F_8$ | 1.62 |
| Grammar + WFST | |
| $F_{i2}$ | 6.85 |
| $F_{i15}$ | −4.96 |
| $F_{i3}$ | 1.41 |
| $F_{11}$ | −1.38 |
| $F_8$ | 1.23 |
| Grammar + Extractor | |
| $F_{i2}$ | 7.47 |
| $F_{i15}$ | −5.60 |
| $F_{i3}$ | 1.96 |
| $F_{11}$ | −1.92 |
| $F_{i1}$ | 1.32 |
| N-gram + FST | |
| $F_{i15}$ | −18.08 |
| $F_{i2}$ | 4.07 |
| $F_{11}$ | −2.31 |
| $F_{i16}$ | 1.72 |
| $F_{i1}$ | 1.54 |
| N-gram + WFST | |
| $F_{i2}$ | 2.29 |
| $F_{i1}$ | 1.93 |
| $F_{i16}$ | 1.47 |
| $F_8$ | 1.30 |
| $F_{12}$ | 0.73 |
| N-gram + Extractor | |
| $F_{i2}$ | 2.29 |
| $F_{i16}$ | 1.62 |
| $F_{i1}$ | 1.56 |
| $F_{i7}$ | 0.98 |
| $F_8$ | 0.93 |

In TABLE 7, features with overall increased absolute values of coefficients are feature $F_{i2}$ representing a sound likelihood difference with the utterance verification language model and features $F_{i15}$ representing whether or not speech understanding results are obtained. A larger sound likelihood difference than the feature $F_{i2}$ represents that the understanding results are more likely to be a correct solution. The reason why a coefficient of the feature $F_{i15}$ has a large negative value is that it is not a correct solution when the speech understanding results are not obtained. In addition, feature $F_{11}$ representing the maximum value of the number of concepts was effective for a speech understanding scheme using the grammar model and feature $F_{i16}$ representing whether the understanding results are positive or negative utterances was effective for a speech understanding scheme using the N-gram model.

(5. Speech Understanding Experiment)

The speech understanding results obtained in the example of the speech understanding apparatus 1 of this embodiment were evaluated. The evaluation experiment uses the 4,513 utterances described in the above subsection 4.2. The learning unit 50 fitted feature selection to coefficients of the logistic regression equation using 2,193 utterances of learning data, and, for 2,320 utterances of evaluation data, speech understanding results by a combination of the speech recognition processing units 24-1 to 24-N and the language understanding processing units 32-1 to 32-M were assigned utterance batch confidence, and one of the speech understanding results was selected based on the utterance batch confidence. This embodiment uses the following two evaluation measures of the speech understanding results.

(1) Utterance full understanding accuracy
(2) Concept understanding accuracy

The former, an utterance full understanding accuracy, is a speech understanding accuracy of the utterance batch and is obtained according to the following Equation (3).

Utterance full understanding accuracy=(Number of fully correct utterances)/(Number of overall utterances) (3)

The number of correctly understanding results is the number by which a string of concepts included in one utterance can be output without any errors. Here, the utterance batch confidence by the logistic regression estimates whether or not the speech understanding results are perfectly correct in the utterance batch. In this embodiment, it is preferable that the obtained results are perfectly correct solutions in the utterance unit in order to obtain a final result with the highest confidence. The utterance full understanding accuracy is used to estimate whether or not the selection method of this embodiment can select a result of a perfectly correct solution in the utterance unit.

The latter, a concept understanding accuracy, is a concept unit speech understanding accuracy and is obtained according to the following Equation (4).

Concept understanding accuracy=1−(Number of error concepts/Number of concepts included in overall utterances) (4)

The number of error concepts is obtained by the sum of the number of substitution error concepts, the number of deletion error concepts, and the number of insertion error concepts.

(5.1 Comparison with Single Scheme)

TABLES 8 and 9 respectively show utterance full understanding accuracy and concept understanding accuracy achieved when this embodiment and a single language model/language understanding model are used. In TABLE 9, Sub, Del, and Ins represent substitution error rate, deletion error rate, and insertion error rate, respectively.

TABLE 8

(Utterance full understanding accuracy by scheme using single language model/language understanding model and this embodiment)

| Speech understanding scheme | Utterance full understanding accuracy (%) |
| --- | --- |
| Grammar + FST | 79.8 |
| Grammar + WFST | 80.0 |
| Grammar + Extractor | 79.8 |
| N-gram + FST | 79.3 |
| N-gram + WFST | 84.2 |
| N-gram + Extractor | 84.6 |
| MLMU&CMBS | 86.8 |

TABLE 9

(Concept understanding accuracy by scheme using single language model/language understanding model and this embodiment (%))

| Speech understanding scheme | Concept understanding accuracy | Sub | Del | Ins |
| --- | --- | --- | --- | --- |
| Grammar + FST | 81.5 | 11.3 | 2.6 | 4.5 |
| Grammar + WFST | 82.0 | 11.2 | 3.2 | 3.6 |
| Grammar + Extractor | 81.5 | 11.3 | 2.6 | 4.5 |
| N-gram + FST | 78.7 | 4.8 | 13.7 | 2.8 |
| N-gram + WFST | 87.8 | 6.5 | 2.9 | 2.9 |
| N-gram + Extractor | 87.7 | 6.9 | 2.4 | 3.0 |
| MLMU&CMBS | 89.8 | 6.3 | 1.4 | 2.6 |

In TABLE 8, the accuracy by N-gram+WFST is 84.2% and the accuracy by N-gram+Extractor is 84.6%, which are higher than those by 4 different schemes. This was because the use of the N-gram model could provide speech recognition accuracy higher than that by the use of the grammar model and could output more strings of correct solution concepts than that in the grammar model. In addition, for language understanding by WFST and Extractor, this was because language understanding results could be output even for speech recognition results unacceptable in FST.

On the other hand, the utterance full understanding accuracy by the speech understanding apparatus 1 of this embodiment was 86.8%. This is an accuracy higher than that in any speech understanding scheme using a single language model/language understanding model. This shows that appropriate correct solution results can be selected from results of multiple speech understanding schemes using the selection method of this embodiment.

(5.2 Comparison with Speech Understanding Scheme Using One of Multiple Language) Models/Language Understanding Models Comparison is made between this embodiment and a speech understanding scheme using one of multiple language models/language understanding models. TABLES 10 and 11 respectively show utterance full understanding accuracy and concept understanding accuracy in each scheme.

TABLE 10

(Utterance full understanding accuracy achieved when multiple language models/language understanding models are used (%))

| Model used | CMBS | oracle |
| --- | --- | --- |
| Lms + FST | 84.4 | 85.2 |
| Lms + WFST | 86.3 | 88.4 |
| Lms + Extractor | 86.4 | 88.2 |
| Grammar + LUMs | 80.2 | 80.8 |
| N-gram + LUMs | 84.9 | 85.5 |
| LMs + LUMs(MLMU) | 86.8 | 89.0 |

TABLE 11

(Concept understanding accuracy achieved when multiple language models/language understanding models are used (%))

| Model used | CMBS | oracle |
|---|---|---|
| Lms + FST | 84.4 | 85.2 |
| Lms + WFST | 86.3 | 88.4 |
| Lms + Extractor | 86.4 | 88.2 |
| Grammar + LUMs | 80.2 | 80.8 |
| N-gram + LUMs | 84.9 | 85.5 |
| LMs + LUMs(MLMU) | 86.8 | 89.0 |

In the above TABLES, LMs and LUMs respectively represent using multiple language models and multiple language understanding models. That is, LMs used two kinds of language models, i.e., the grammar model and the N-gram model, and LUMs used three kinds of language understanding models, i.e., FST, WFST and Extractor, for speech recognition results. As methods of integrating multiple understanding results, CMBS represents a selection based on the utterance batch confidence implemented in this embodiment and oracle represents a manual selection of an optimal understanding result. In the manual selection, one with the highest speech understanding accuracy of output speech understanding results was selected. This is because an effect by performance of the integrating methods is eliminated and the upper limit of performance achieved when multiple language models and multiple language understanding models are used is examined.

In TABLE 10, the utterance full understanding accuracy achieved when both of multiple language models and multiple language understanding models are used to manually select understanding results was 89.0%. This value is an accuracy higher than that achieved when one of the multiple language models and the multiple language understanding models is used. This demonstrates that the use of both of the multiple language models/the multiple language understanding models by MLMU can realize speech understanding with an accuracy higher than that realized by the use of one of the multiple language models/the multiple language understanding models.

According to the example of the speech understanding apparatus 1 of this embodiment, the utterance full understanding accuracy achieved when both of the multiple language models and the multiple language understanding models are used to select understanding results by CMBS is substantially equal to that achieved when multiple language models is used. This shows that it is important to use multiple language models in order to obtain speech understanding results which do not include errors at all. If errors exist in the speech recognition results and correct solution words have been already omitted, it is impossible for the language understanding unit to recover the omitted correct solution words. By obtaining multiple speech recognition results by multiple language models, since there is an increased possibility that a correct solution is included in any of the speech recognition results, it can be said that the use of the multiple language models contributes to improvement of the utterance full understanding accuracy.

(5.3 Comparison with Conventional Integrating Method)

In integrating multiple understanding results into one speech understanding result, CMBS realized by the language understanding apparatus 1 of this embodiment is compared with a conventional ROVER method. The ROVER method is a weighted majority voting in concept unit and includes the following two steps.

(1) According to a DP matching, concepts in multiple speech understanding results are associated with one another.

(2) If there are competing concepts of the associated concepts, proper concepts are selected based on their scores. A score of a concept cp at an alignment position i is calculated based on the following Equation (5).

$$\text{Score}(cp) = \alpha * (N(cp,i)/Ns) + (1-\alpha) * \text{Conf}(cp) \quad (5)$$

In this equation, N(cp,i) represents the number of concepts cp residing in the alignment position i, Ns represents the number of speech understanding schemes used, and Conf(cp) represents the mean of concept confidences of the concepts cp residing in the alignment position i based on a posteriori probability. $\alpha$ and Conf(@) are parameters and are estimated using learning data.

TABLE 12 shows accuracies in integration in CMBS, ROVER method and oracle for 6 understanding results by two kinds of language models and three kinds of language understanding models.

TABLE 12

(Comparison between this embodiment and ROVER method (%))

| Integrated Method | Utterance full understanding accuracy | Concept understanding accuracy |
|---|---|---|
| CMBS | 86.8 | 89.8 |
| ROVER method | 82.7 | 85.9 |
| oracle | 89.0 | 91.9 |

As shown in TABLE 12, this embodiment employing CMBS provides utterance full understanding accuracy and concept understanding accuracy higher than those achieved in the ROVER method. This is because, if some wrong understanding results are included in multiple understanding results, the ROVER method outputs results strongly affected by the wrong understanding results. In addition, the ROVER method, which was employed in this experiment, used only the concept confidence based on the posteriori probability but did not use multiple features. Accordingly, it is considered that scores of concepts at each alignment position could not have proper values and concepts could not be properly selected.

In order to examine whether or not there is a statistically significant difference in improvement of speech understanding accuracy, a McNemar statistical test was conducted for the utterance full understanding accuracy and a Wilcoxon sign rank statistical test was conducted for the concept understanding accuracy. The McNemar statistical test is a test for examining whether or not there is a difference in population proportion between two corresponding groups of category data, and the Wilcoxon sign rank statistical test is a nonparametric test for examining whether or not there is a difference in the population representative value between two corresponding groups of interval measure/proportion measure data. As a result of the above statistical tests, the concept precision showed a significant difference of significance level of 1% between this embodiment and the N-gram+WFST having the highest accuracy in a single understanding scheme or the LMs+WFST showing the highest performance in an understanding scheme using one of multiple language models and language understanding models. However, the utterance full understanding accuracy showed no significant difference between this embodiment and the LMs+WFST and LMs+Extractor.

(6. Summary)

This embodiment has illustrated the speech understanding apparatus using multiple language models and multiple language understanding models for the purpose of achieving high accuracy speech understanding. The evaluation experiment demonstrated improvement of the concept understanding accuracy by this embodiment compared to a scheme using one of the language models and the language understanding models and a scheme using the ROVER method.

As apparent from the above description, the speech understanding apparatus of this embodiment provides the following advantages.

(1) The effectiveness of the use of both of the language models and the language understanding models is achieved. Although research using one of multiple language models and multiple language understanding models have been previously conducted, there is no research using both of them. By employing both of the multiple language models and the multiple language understanding models, this embodiment can realize speech understanding with accuracy higher than that achieved by the use of one of the multiple language models and the multiple language understanding models.

(2) As a method of integrating multiple understanding results, a novel selection method to provide speech understanding with high accuracy can be realized. Conventional common weighted majority voting had a problem that speech understanding is affected by results of understanding schemes with a low level of performance. This embodiment builds a logistic regression equation to predict whether or not a speech understanding result is correct, and makes a proper selection based on output utterance batch confidence. This allows a proper speech understanding scheme for each utterance to be output without being affected by a model with a low level of performance.

Although the logistic regression has been used to calculate the utterance batch confidence in this embodiment, the confidence may be calculated using other various methods such as linear regression and the like.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A speech understanding apparatus comprising:
    a speech recognition unit which performs speech recognition of an utterance using multiple language models, and outputs multiple speech recognition results for the utterance obtained by using the multiple language models;
    a language understanding unit which uses multiple language understanding models to perform language understanding for each of the multiple speech recognition results output from the speech recognition unit, and outputs multiple speech understanding results for each of the multiple speech recognition results for the utterance obtained from using the multiple language models; and
    an integrating unit which calculates, based on values representing features of the speech understanding results, utterance batch confidences that numerically express accuracy of the speech understanding results for each of the multiple speech understanding results output from the language understanding unit, and selects one of the speech understanding results with a highest utterance batch confidence among the calculated utterance batch confidences.

2. The speech understanding apparatus according to claim 1, wherein the values representing features of the speech understanding results are one or more of values obtained based on utterance length, sound scores obtained when the speech recognition is performed, the number of concepts included in the speech understanding results, confidence of the concepts, whether or not the speech understanding results are obtained, and whether the speech understanding results are positive or negative utterances.

3. The speech understanding apparatus according to claim 1, further comprising a learning unit which determines weights of the values representing the features to provide a maximum likelihood for each combination of the multiple language models and the multiple language understanding models, based on the values representing the features of the speech understanding results obtained from existing utterances and on values representing whether or not the speech understanding results are correct.

4. The speech understanding apparatus according to claim 3, wherein the learning unit selects features having high correlation with other features for each of the combinations of the multiple language models and the multiple language understanding models, based on the determined weights of the features, and uses one of the selected features to calculate the utterance batch confidence.

5. The speech understanding apparatus according to claim 3, wherein the learning unit selects features having less effect on the calculation of the utterance batch confidence for each of the combinations of the multiple language models and the multiple language understanding models, and excludes the selected features from the features used for the calculation of the utterance batch confidence.

6. The speech understanding apparatus according to claim 3, wherein the learning unit calculates the utterance batch confidence by a logistic regression equation using the values representing the features for each of the combinations of the multiple language models and the multiple language understanding models.

* * * * *